(12) United States Patent
Warburton-Pitt

(10) Patent No.: US 6,379,596 B1
(45) Date of Patent: Apr. 30, 2002

(54) METHOD OF FORMING A FITTING FOR A REINFORCED SILICONE TUBE

(75) Inventor: Stephen Warburton-Pitt, Andover, NJ (US)

(73) Assignee: Truseal, Inc., Andover, NJ (US)

( * ) Notice: Subject to any disclaimer, the term of this patent is extended or adjusted under 35 U.S.C. 154(b) by 0 days.

(21) Appl. No.: 09/541,746

(22) Filed: Apr. 3, 2000

(51) Int. Cl.[7] .......................... B29C 57/00; B29C 65/70; B29C 70/02
(52) U.S. Cl. .................... 264/139; 264/257; 264/263; 264/274; 138/109; 285/222.3
(58) Field of Search .................. 264/139, 255, 264/257, 263, 274, 138; 138/109; 285/222.1, 222.3

(56) References Cited

U.S. PATENT DOCUMENTS

| | | | |
|---|---|---|---|
| 2,246,404 A | 6/1941 | Ross | 15/155 |
| 3,263,520 A | 8/1966 | Tschanz | 74/501 |
| 3,660,887 A * | 5/1972 | Davis | 264/262 |
| 3,920,049 A | 11/1975 | Lippert et al. | 138/109 |
| 4,088,156 A | 5/1978 | Kubo et al. | 138/109 |
| 4,323,089 A | 4/1982 | Kadono et al. | 138/109 |
| 4,592,749 A * | 6/1986 | Ebling et al. | 604/533 |
| 4,750,525 A * | 6/1988 | Vaughan | 138/89 |
| 4,756,560 A | 7/1988 | Dobo et al. | 285/149 |
| 5,320,389 A | 6/1994 | Dupont, Jr. | 285/294 |
| 5,608,963 A * | 3/1997 | Lefere | 29/525.01 |

* cited by examiner

Primary Examiner—Jan H. Silbaugh
Assistant Examiner—Stefan Staicovici
(74) Attorney, Agent, or Firm—David L. Davis

(57) ABSTRACT

A method for forming a fitting at an end of a braid-reinforced silicone tube. A short length of the outer layer surrounding the braiding is removed and the exposed braiding is folded back over a first silicone ring and then a second silicone ring is placed over the folded-over braiding. The end of the tube is then placed in a mold which is then filled with liquid silicone. After the silicone is heated and cured, a unitary structure of tube and fitting results. Since the braiding is part of the unitary structure, it cannot be pulled out, thereby increasing the reliability of tube and fitting.

3 Claims, 3 Drawing Sheets

METHOD OF FORMING A FITTING FOR A REINFORCED SILICONE TUBE

BACKGROUND OF THE INVENTION

This invention relates to silicone tubes having an internal layer of reinforcing braiding and, more particularly, to a method for forming a clampable fitting at the end of such a tube.

Since silicone is a relatively inert chemical in aqueous solutions, i.e., it does not react with contacting liquids or leach chemicals into contacting liquids, it is a material that has obvious advantages in use as tubing for many applications, including pharmaceutical manufacture and intravenous drug delivery. In some of these applications, a quick-disconnect clampable fitting is used for the interconnection of such silicone tubes. U.S. Pat. No. 5,320,389, discloses such a fitting which is designed to be secured to the end of a tube in the field. For high pressure applications, the silicone tubes have an intermediate internal layer of reinforcing braiding sandwiched between inner and outer layers of silicone. The braiding is usually made of polyester or a Kevlar-like material. In the past, problems have been encountered where the braiding is pulled, within the tube, away from the fitting, causing a failure of the tube. It would therefore be desirable to have a method of providing a fitting at the end of a reinforced silicone tube which does not suffer from the aforedescribed disadvantages.

SUMMARY OF THE INVENTION

According to the present invention, a method for forming a fitting at an end of a silicone tube having an internal layer of reinforcing braiding comprises the steps of removing the outer silicone layer of the tube for a predetermined length from the end of the tube to expose the internal layer of the braiding along that length, placing a first silicone ring over the exposed layer of braiding, folding the exposed layer of braiding over the first ring, and placing a second silicone ring over the folded-over layer of braiding. A mold having a cavity shaped as a desired fitting is provided and the tube end with the first and second rings is inserted into the mold cavity. The mold cavity is then filled with liquid silicone, which is heated and cured to form a fitting and the fitting is then removed from the mold cavity.

In accordance with an aspect of this invention, the first ring is placed substantially midway along the fixed length of exposed braiding. Accordingly, when the exposed braiding is folded over the first ring, there is no overlap of the exposed braiding over the uncut outer silicone layer of the tube.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
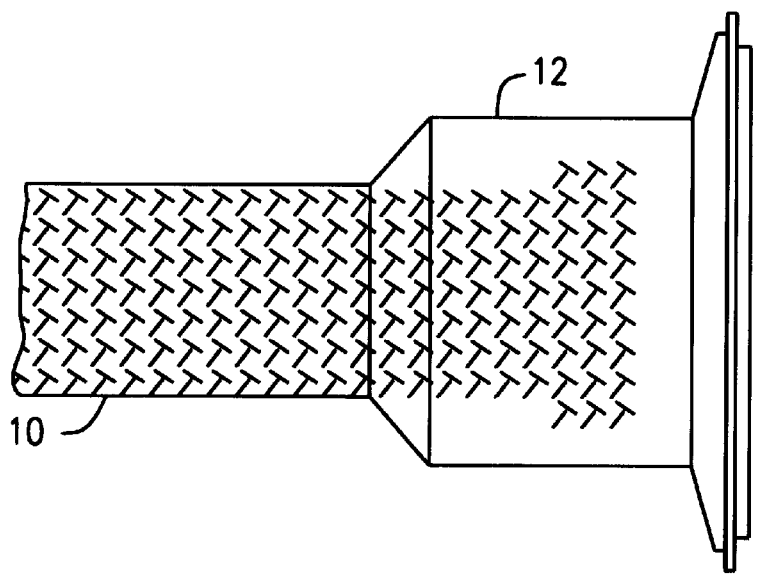
FIG. 1 is a side view of a reinforced silicone tube provided with a fitting at its end in accordance with the present invention.
Figure 2:
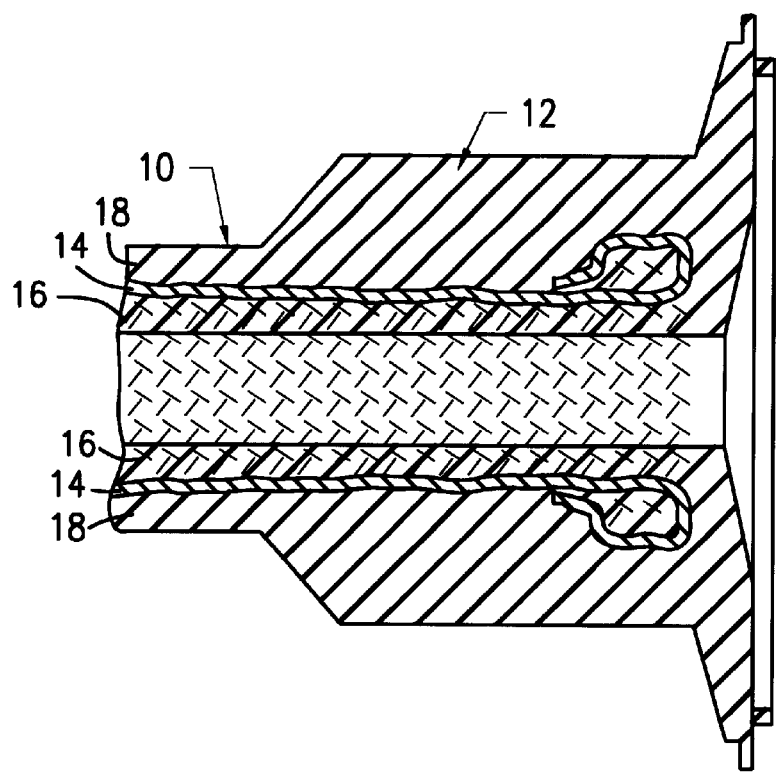
FIG. 2 is an axial cross sectional view through the tube and fitting of FIG. 1.
Figure 3:
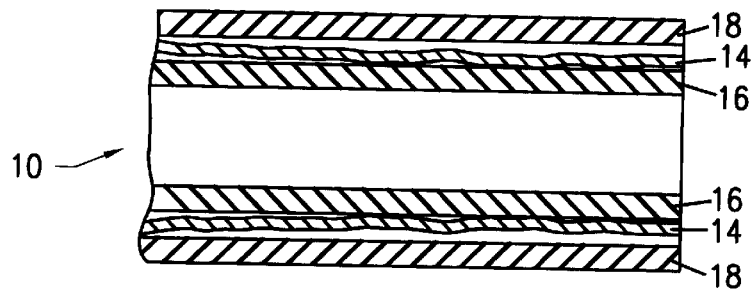
FIGS. 3–5 illustrate steps in practicing the present invention.

FIG. 1 shows a reinforced silicone tube 10 having a clampable fitting 12 formed at one end thereof. As best seen in FIG. 2, the tube 10 has an internal layer of reinforcing braiding 14 sandwiched between an inner layer 16 and an outer layer 18. The fitting 12 is formed of silicone and is integrally bonded to the layers 16, 18. The silicone surrounds the individual fibers of the braiding 14 so that the braiding 14 cannot be separated from the fitting 12.

Figure 4:
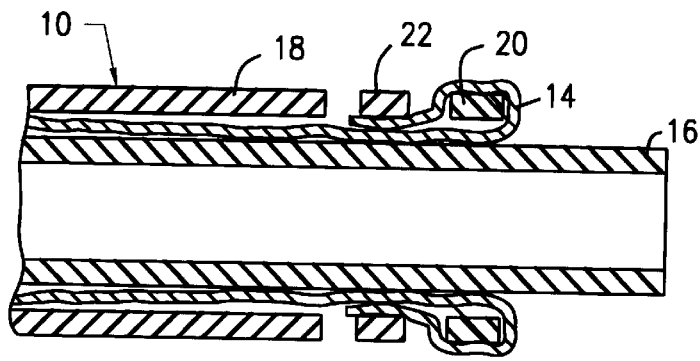
Figure 6:
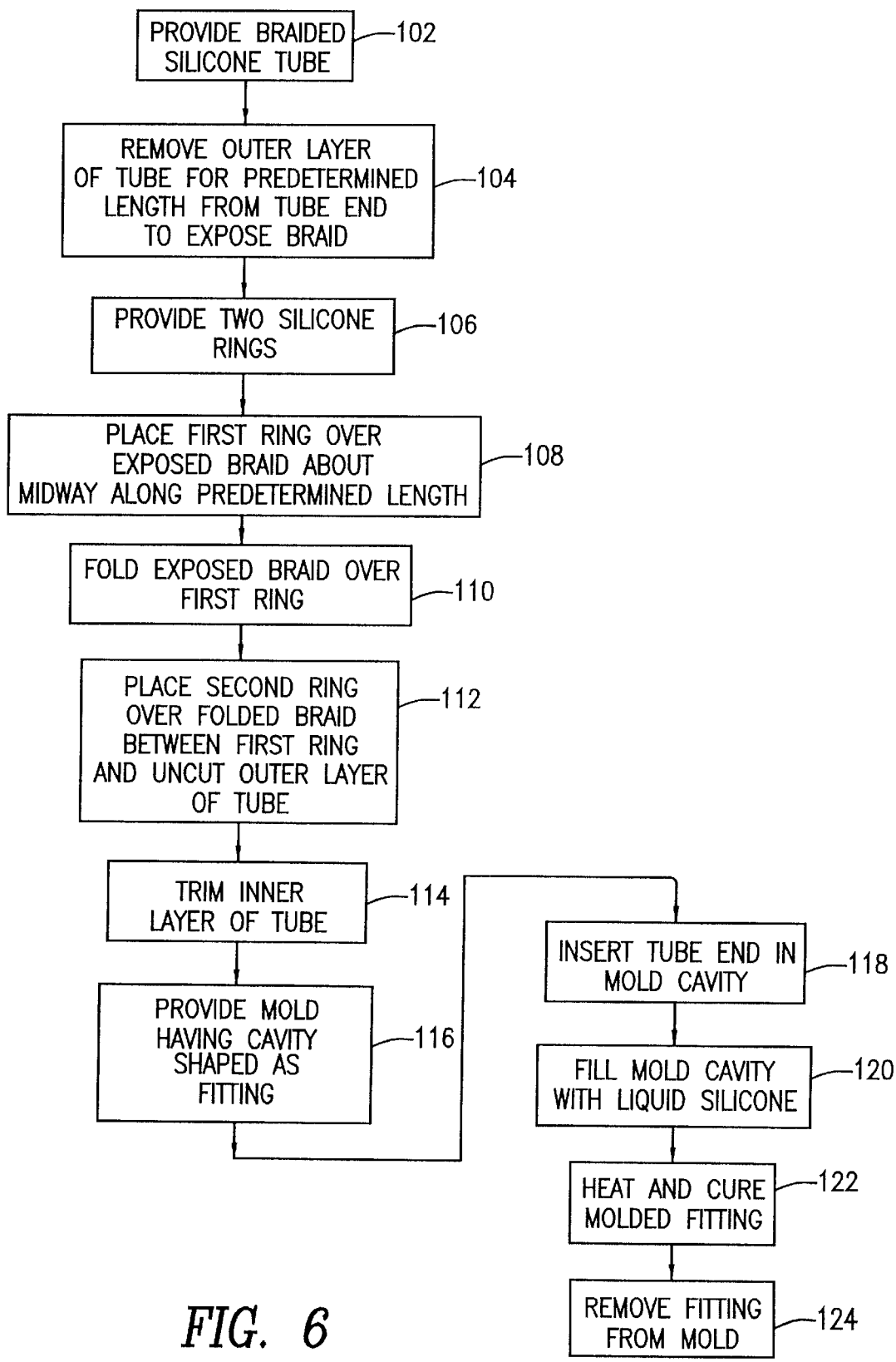
FIG. 6 is a flow chart showing the steps for forming the fitting at the end of a tube in accordance with the present invention.

To produce the fitting 12 at the end of the tube 10, as shown in FIGS. 1 and 2, the first step is to provide a braided silicone tube. As shown in FIG. 6, this is the step 102. Next, the outer layer 18 of the tube 10 is removed for a predetermined length from the end of the tube 10 to expose the braiding 14 along that length, as indicated by the step 104 and as shown in FIG. 4. Next, two silicone rings 20, 22 are provided, as indicated by the step 106. The first silicone ring 20 is placed over the exposed braiding 14 about midway along the predetermined length, as indicated by the step 108. According to the step 110, as shown in FIG. 4, the exposed braiding 14 is folded over the ring 20. The placement of the ring 20 is such that when the braiding 14 is folded thereover, there is no overlap of the braiding 14 over the uncut outer layer 18 of the tube 10, as is clear from FIG. 4.

The second ring 22 is then placed over the folded braiding 14 between the first ring 20 and the uncut outer layer 18 of the tube 10, as indicated by the step 112 and as shown in FIG. 4. It is noted that the rings 20, 22 are somewhat elastic so that they can be stretched, put in place, and then released to firmly hold the braiding 14 against the inner layer 16 of the tube 10. The inner layer 16 of the tube 10 is then trimmed close to the folded-over braiding 14, as is clear from FIG. 5 and as indicated in step 114.

Figure 5:
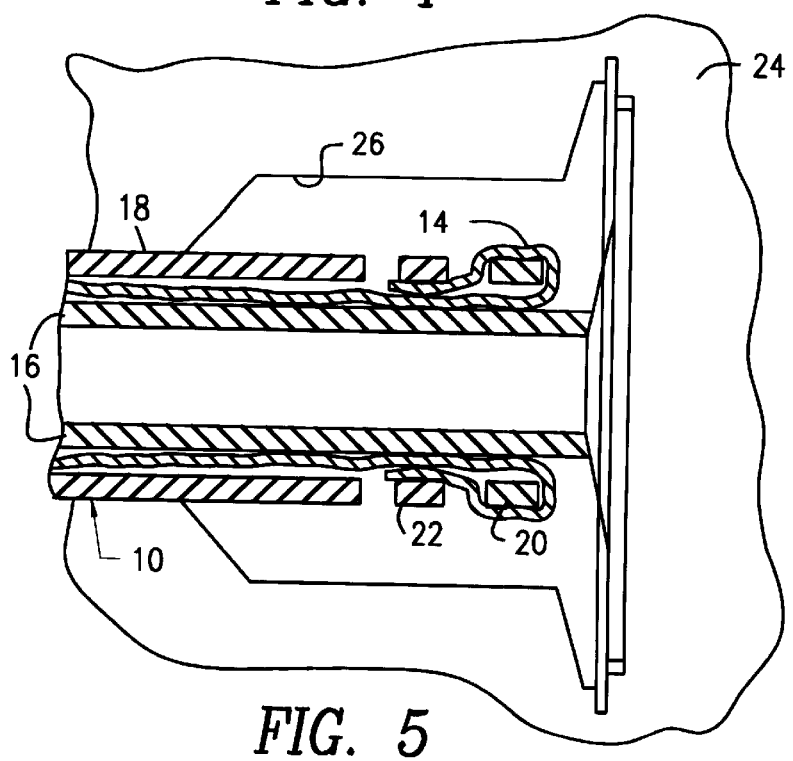

As shown by the step 116 and FIG. 5, a mold 24 is provided having a cavity 26 shaped as the desired fitting 12. As shown in FIG. 5, and by the step 118, the end of the tube 10, with the rings 20, 22 in place, is then inserted into the mold cavity 26. As shown by the steps 120 and 122, the mold cavity 26 is filled with liquid silicone, which is then heated and cured. The added liquid silicone fuses and integrates with the silicone of the tube layers 16, 18 and of the rings 20, 22 and flows around the individual fibers of the exposed braiding 14 so as to form a unitary fitting 12, as shown in FIG. 2. This fitting 12, and the tube 10, are then removed from the mold 24, as indicated by the step 124.

Accordingly, there has been disclosed a method for forming a fitting at an end of a reinforced silicone tube. While an illustrative embodiment of the inventive method has been disclosed herein, it is understood that various adaptations and modifications to the disclosed method are possible, and it is intended that this invention be limited only by the scope of the appended claims.

What is claimed is:

1. A method for forming a fitting at an end of a silicone tube having an internal layer of reinforcing braiding, comprising the steps of:

provided a tube having an internal layer of reinforcing braiding sandwiched between inner and outer layers of silicone;

removing the outer silicone layer of the tube for a predetermined length from the end of the tube to expose the internal layer of braiding along that length;

providing first and second silicone rings;

placing the first ring over the exposed layer of braiding;

folding the exposed layer of braiding from the tube end to the first ring over the first ring;

placing the second ring over the folded-over layer of braiding;

providing a mold having a cavity shaped as a desired fitting;

inserting the tube end with the first and second rings into the mold cavity;

filling the mold cavity with liquid silicone;

heating and curing the liquid silicone to form a fitting; and removing the fitting from the mold cavity.

2. The method according to claim 1 wherein the step of placing the first ring includes the step of placing the first ring substantially midway along the predetermined length of exposed braiding;

whereby when the exposed braiding is folded over the first ring there is no overlap of the exposed braiding over the uncut outer silicone layer of the tube.

3. The method according to claim 1 further including the step of:

trimming the exposed inner layer of silicone after the step of folding and before the step of inserting.

* * * * *